(12) United States Patent
Gozun et al.

(10) Patent No.: US 11,389,913 B2
(45) Date of Patent: Jul. 19, 2022

(54) ASSEMBLING AND DISASSEMBLING A MECHANICAL SEAL

(71) Applicant: Saudi Arabian Oil Company, Dhahran (SA)

(72) Inventors: Darwin G. Gozun, Al Hasa (SA); Raed Al-Hadlaq, Al Hasa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/020,150

(22) Filed: Sep. 14, 2020

(65) Prior Publication Data
US 2022/0080539 A1 Mar. 17, 2022

(51) Int. Cl.
*B23P 19/04* (2006.01)
*F16J 15/34* (2006.01)

(52) U.S. Cl.
CPC .............. *B23P 19/04* (2013.01); *F16J 15/34* (2013.01); *Y10T 29/49719* (2015.01)

(58) Field of Classification Search
CPC .. F16J 15/3436; F16J 15/3452; F16J 15/3464; F16J 15/3472; B23P 19/04; Y10T 29/49719
See application file for complete search history.

(56) References Cited

U.S. PATENT DOCUMENTS

| | | | | |
|---|---|---|---|---|
| 852,145 A * | 4/1907 | Stevens | ................... | B25B 27/26 29/219 |
| 1,621,237 A * | 3/1927 | McClain | ................. | B25B 27/26 29/220 |
| 1,734,122 A * | 11/1929 | Glaspy | .................... | B25B 27/26 29/220 |
| 1,734,420 A * | 11/1929 | Curtis | ..................... | B25B 27/26 29/220 |
| 1,875,595 A * | 9/1932 | Harris, Jr. | ............... | B25B 27/26 29/220 |
| 2,627,653 A * | 2/1953 | Wisner | .................... | B25B 27/26 29/220 |

(Continued)

FOREIGN PATENT DOCUMENTS

| | | |
|---|---|---|
| DE | 802688 | 2/1951 |
| DE | 4432318 | 3/1996 |

OTHER PUBLICATIONS

PCT International Search Report and Written Opinion in International Appln. No. PCT/US2021/050079, dated Jan. 3, 2022, 15 pages.

*Primary Examiner* — Jason L Vaughan
(74) *Attorney, Agent, or Firm* — Fish & Richardson P.C.

(57) ABSTRACT

A mechanical seal clamping assembly includes a base, a fulcrum, a lever, and a cap. The base supports a mechanical seal. The lever is pivotally coupled to the fulcrum at a first pivot spaced from the base. The cap is coupled to the lever and is movable by the lever with respect to the base. The cap is movable from a first position to a second position. In the first position, the cap is at a first distance away from the base. In the second position, the cap is at a second distance away from the base larger than the first distance. The lever moves the cap from the second position toward the first position to engage the mechanical seal to clamp, between the cap and the base, the mechanical seal to maintain a spring of the mechanical seal compressed during assembly or disassembly of the mechanical seal.

18 Claims, 6 Drawing Sheets

(56) References Cited

U.S. PATENT DOCUMENTS

| | | | |
|---|---|---|---|
| 3,028,664 A * | 4/1962 | Shepanski | B25B 27/02 29/282 |
| 4,074,411 A * | 2/1978 | Willard | B25B 27/02 29/267 |
| 4,223,431 A | 9/1980 | Skeels et al. | |
| 4,266,330 A * | 5/1981 | Conte | B23P 19/04 29/267 |
| 5,351,413 A | 10/1994 | Bruner et al. | |
| 5,544,400 A * | 8/1996 | Wells | B25B 27/26 29/227 |
| 5,915,740 A | 6/1999 | Weitner | |
| 6,374,473 B1 * | 4/2002 | Edwards | B25B 27/26 29/220 |
| 1,386,334 A1 | 8/2021 | Hill et al. | |
| 2016/0067854 A1 | 3/2016 | Moore | |

\* cited by examiner

ASSEMBLING AND DISASSEMBLING A MECHANICAL SEAL

FIELD OF THE DISCLOSURE

This disclosure relates to mechanical seals, and more particularly to methods and tools for maintaining mechanical seals.

BACKGROUND OF THE DISCLOSURE

Mechanical seals can be used in pumps, mixers, compressors, and other similar machines handling fluids. Mechanical seals contain fluid within a vessel where a rotating shaft passes through a housing. Mechanical seals may need to be replaced or maintained to allow the mechanical seal to function properly. To maintain a mechanical seal, the mechanical seal may need to be opened or disassembled. Improvements to the methods and equipment for maintaining mechanical seals are sought.

SUMMARY

Implementations of the present disclosure included a mechanical seal clamping assembly that includes a base, a fulcrum, a lever, and a cap. The base is configured to support a mechanical seal in an upright position. The fulcrum is fixed to the base. The fulcrum extends away from the base. The lever is pivotally coupled to the fulcrum at a first pivot spaced from the base. The cap is coupled to the lever. The cap is movable by the lever with respect to the base. The cap engages a top surface of the mechanical seal. The cap is movable from a first position to a second position. In the first position, the cap is at a first distance away from the base. In the second position, the cap is at a second distance away from the base larger than the first distance. The lever is adapted to move the cap from the second position toward the first position to engage the top surface of the mechanical seal supported on the base to clamp, between the cap and the base, the mechanical seal to maintain a spring of the mechanical seal compressed during assembly or disassembly of the mechanical seal.

In some implementations, the base includes a guide configured to receive and align the mechanical seal with respect to the cap in the first position. In some implementations, the guide includes a ring fixed to the top surface of the base. The ring extends from the top surface of the base. The ring defines an outer diameter less than an inner diameter of a housing of the mechanical seal. The ring is generally aligned with the cap in the first position and is configured to receive the mechanical seal to retain the mechanical seal in a position generally aligned with the cap in the first position.

In some implementations, the mechanical seal clamping assembly further including a locking assembly coupled to the base. The locking assembly includes an arm and a movable pin coupled to the arm. The pin defines a longitudinal axis perpendicular with respect to a length of the lever. The lever includes a handle at a first end of the lever and an angle rotation arm attached to a second end of the lever opposite the first end. The angle rotation arm includes a first hole configured to receive the pin to lock the lever with the cap at the first position, and a second hole configured to receive the pin to lock the lever with the cap at the second position. In some implementations, the fulcrum includes a post attached to and extending in a direction perpendicular with respect to a top surface of the base. The locking assembly is attached to the post, and the pin is movable along the longitudinal axis of the pin to lock the lever to prevent the lever from moving and unlock the lever to allow the lever to move.

In some implementations, the mechanical seal includes a first sleeve defining a first inwardly projecting shoulder and a second sleeve configured to be at least partially disposed inside the first sleeve. The second sleeve defines a second inwardly projecting shoulder. The mechanical seal includes a spring configured to bear against the first shoulder at a first end of the spring and bear against the second shoulder at a second end of the spring to urge, under a preload of the spring, the second sleeve away from the first sleeve. The cap is configured to engage and move, with the cap moving from the second position to the first position, the first sleeve toward the base, thereby compressing the spring. In some implementations, the mechanical seal includes, with the mechanical seal assembled, a pin extending through a slot of the first sleeve and through an aperture of the second sleeve to prevent, under shear load, the second sleeve from moving away from the first sleeve past the slot. The cap is configured to urge, during disassembly of the mechanical seal, the first sleeve toward the base to allow the pin to be removed from the mechanical seal with the spring compressed. In some implementations, the cap includes, with the mechanical seal disassembled, a tooth and the first sleeve includes a slot adapted to receive the tooth to prevent the mechanical seal from turning with respect to the base during clamping of the mechanical seal as the cap moves from the second position to the first position. In some implementations, the base includes a ring that includes an open slot. The ring receives the second sleeve with the open slot aligned with an aperture of the second sleeve to allow the pin to extend past the second inwardly projecting shoulder and align the second sleeve with the slot of the first sleeve during assembly of the mechanical seal.

In some implementations, the cap is pivotally coupled to the lever at a second pivot. The cap is configured to pivot about the second pivot to change an angle of inclination of the cap with respect to the base.

In some implementations, the cap is disposed between the first pivot and a handle of the lever such that a force moving the lever from the second position to the first position is in a direction opposite to a direction of a force applied on the cap by the mechanical seal.

Implementations of the present disclosure include a clamping assembly that includes a base, a fulcrum, a lever, a locking assembly, and a clamping shoe. The base is configured to rest on a horizontal surface and configured to support a mechanical component. The fulcrum is fixed to the base. The fulcrum extends away from the base. The lever is pivotally coupled to the fulcrum at a first pivot spaced from the base. The locking assembly is coupled to the base and is configured to engage the lever to lock the lever from movement with respect to the base. The clamping shoe is attached to and movable by the lever with respect to the base. The clamping shoe is movable from a first position to a second position. In the first position, the clamping shoe is at a first distance away from the base. In the second position, the clamping shoe is at a second distance away from the base. The second distance is larger than the first distance. The lever is adapted to move the clamping shoe from the second position toward the first position to engage the mechanical component supported on the base to clamp, between the clamping shoe and the base, the mechanical component. The locking assembly is configured to lock the lever with the clamping shoe in the first position.

In some implementations, the mechanical component includes a shaft seal of a seawater injection pump. The shaft seal includes a housing and a seal cap disposed, with the shaft seal assembled, at least partially inside the housing. The shaft seal includes a spring disposed inside the housing. The spring urges the seal cap away from the housing. The shaft seal includes a pin extending through the housing and the seal cap to maintain the spring under a preload with the pin under shear force. The clamping shoe urges the housing toward the base to allow the pin, with the spring compressed, to be removed to disassemble the shaft seal.

In some implementations, the mechanical component includes a shaft seal of a seawater injection pump. The shaft seal includes a housing, a seal cap, and a spring disposed between the housing and the seal cap. The base includes a guide extending from a top surface of the base. The guide is configured to receive and align, during assembly of the shaft seal, the seal cap with the housing. The clamping shoe includes a tooth configured to engage an aperture of the housing to align the aperture of the housing with an aperture of the seal cap such that, with the clamping shoe in the first position, the aperture of the housing is aligned with the aperture of the seal cap to insert the pin through the apertures of the housing and the seal cap during assembly of the shaft seal.

In some implementations, the clamping shoe is disposed between the first pivot and a handle of the lever such that a force lowering the lever from the second position to the first position is in a direction opposite to a direction of a force applied on the clamping shoe by the mechanical component.

In some implementations, the locking assembly includes an arm attached to and extending from the fulcrum. The locking assembly includes a movable pin coupled to the arm. The pin defines a longitudinal axis perpendicular with respect to a length of the lever. The lever includes a handle at a first end of the lever and an angle rotation arm attached to a second end of the lever opposite the first end. The angle rotation arm includes a first hole configured to receive the pin to lock the lever with the clamping shoe at the first position, and a second hole configured to receive the pin to lock the lever with the clamping shoe at the second position.

Implementations of the present disclosure include a method that includes obtaining a clamping assembly. The clamping assembly includes a base, a fulcrum fixed to and extending away from the base, a lever pivotally coupled to the fulcrum at a first pivot spaced from the base, and a cap. The cap is coupled to and movable by the lever with respect to the base. The cap is movable from a first position with the cap at a first distance away from the base to a second position with the cap at a second distance away from the base larger than the first distance. The method also includes moving, by the lever, the cap to the second position. The method also includes disposing, on the base, a mechanical seal in an upright position. The method also includes moving, by the lever, the cap toward the first position to engage a top surface of the mechanical seal to clamp, between the cap and the base, the mechanical seal to maintain a spring of the mechanical seal compressed during assembly or disassembly of the mechanical seal.

In some implementations, the mechanical seal includes a housing and a seal cap disposed, with the mechanical seal assembled, at least partially inside the housing. The mechanical seal includes a spring disposed inside the housing. The spring is configured to urge the seal cap away from the housing. The mechanical seal includes a pin extending through the housing and the seal cap to maintain the spring under a preload with the pin under shear force. The method further includes moving, by the lever, the cap to urge the housing toward the base to allow the pin to be removed to disassemble the mechanical seal, with the spring compressed.

In some implementations, the mechanical seal includes a housing, a seal cap, and a spring disposed between the housing and the seal cap. The base includes a guide extending from a top surface of the base. The guide is configured to receive and align, during assembly of the mechanical seal, the seal cap with the housing. The cap includes a tooth configured to engage an aperture of the housing to align the aperture of the housing with an aperture of the seal cap such that, with the cap in the first position, the aperture of the housing is aligned with the aperture of the seal cap. The method further includes moving, by the lever, the cap toward the first position with the tooth insert in the aperture of the housing to align the aperture of the housing with the aperture of the seal cap. The method further includes inserting a pin through the aperture of the housing and through the aperture of the seal cap to assemble the mechanical seal.

In some implementations, disposing the mechanical seal on the base includes inserting a guide of the base on the mechanical seal to align the mechanical seal with the cap in the first position.

DETAILED DESCRIPTION OF THE DISCLOSURE

The present disclosure describes a clamping tool used to assemble and disassemble a mechanical seal. The clamping tool has a lever that, when lowered, lowers a cap that engages the mechanical seal to compress a spring of the mechanical seal. The lever can be locked in a first position, with the lever lowered and the mechanical seal compressed, or in a second position, with the lever lifted and the mechanical seal not compressed.

Particular implementations of the subject matter described in this specification can be implemented so as to realize one or more of the following advantages. For example, the clamping assembly of the present disclosure allows one technician to disassemble and assemble a mechanical seal without the need of having a second technician compress the spring while assembling or disassembling the mechanical seal. The clamping assembly can replace the practice of using hand force to compress the spring in order to assemble or disassemble the mechanical seal. The clamping assembly can save time and increase the safety of assembling and disassembling mechanical seals.

Figure 1:
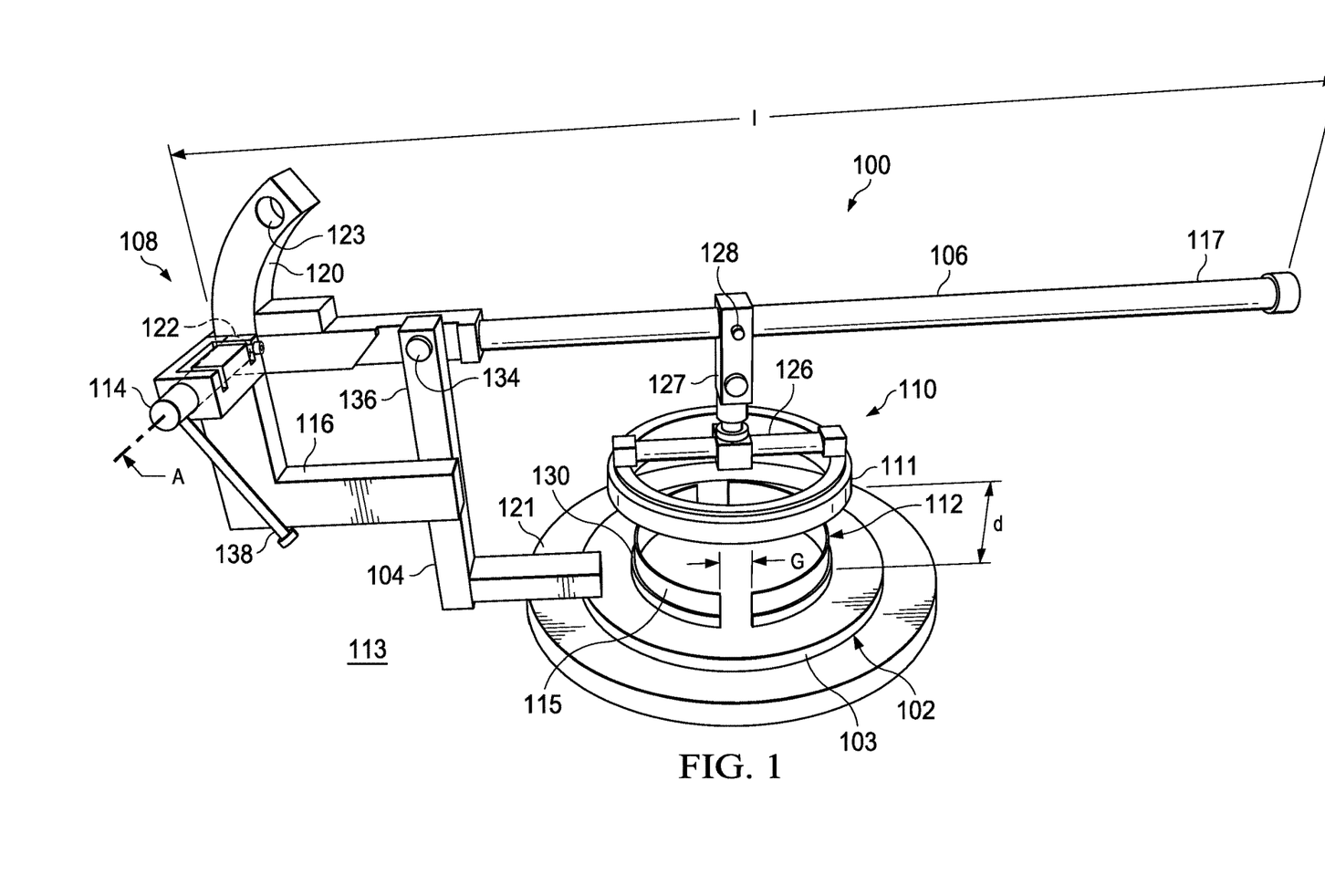
FIG. 1 is a front perspective view of a clamping assembly with a cap of the camping assembly in a first position according to implementations of the present disclosure.

FIG. 1 shows a clamping assembly 100 or tool (e.g., a mechanical seal clamping assembly) that includes a base 102, a fulcrum 104 fixed to and extending away from the base, a lever 106 pivotally coupled to the fulcrum 104 at a first pivot 134 spaced from the base 102, a locking assembly 108 coupled to the base 102, and a clamping shoe 110 attached to and movable by the lever 106 with respect to the base 102.

As described in detail below with respect to FIG. 3, the base 102 supports a mechanical seal (e.g., a shaft seal of a fluid pump) in an upright position to clamp, with the clamping shoe 110, the mechanical seal. The base 102 includes a plate 103 that rests on a horizontal surface 113. The plate 103 has a top surface 121 opposite and facing away from the horizontal surface 113. The plate 103 includes a guide 112 that receives and aligns the mechanical seal with respect to the clamping shoe 110. The guide 103 can include a ring 115 or a curved rib fixed to and extending from the top surface 121 of the plate 103. The ring 115 can have an outer diameter smaller than an inner diameter of the mechanical seal to accommodate the mechanical seal around the ring 115. As further described in detail below with respect to FIGS. 5 and 6, the ring 115 has a gap 'G' that helps align the mechanical seal with the clamping shoe 110. The ring 115 has a step 130 to snuggly accommodate the mechanical seal on the base 102.

The lever 106 has a handle 117 at a first end of the lever 106 that allows an operator to lift or lower the lever to move the clamping shoe 110 with respect to the base 102. The clamping shoe 110 resides between the handle 117 and the locking assembly 108. The lever 106 has a length 'l' of about between 30 and 35 inches (e.g., 33.625 inches).

Figure 4:
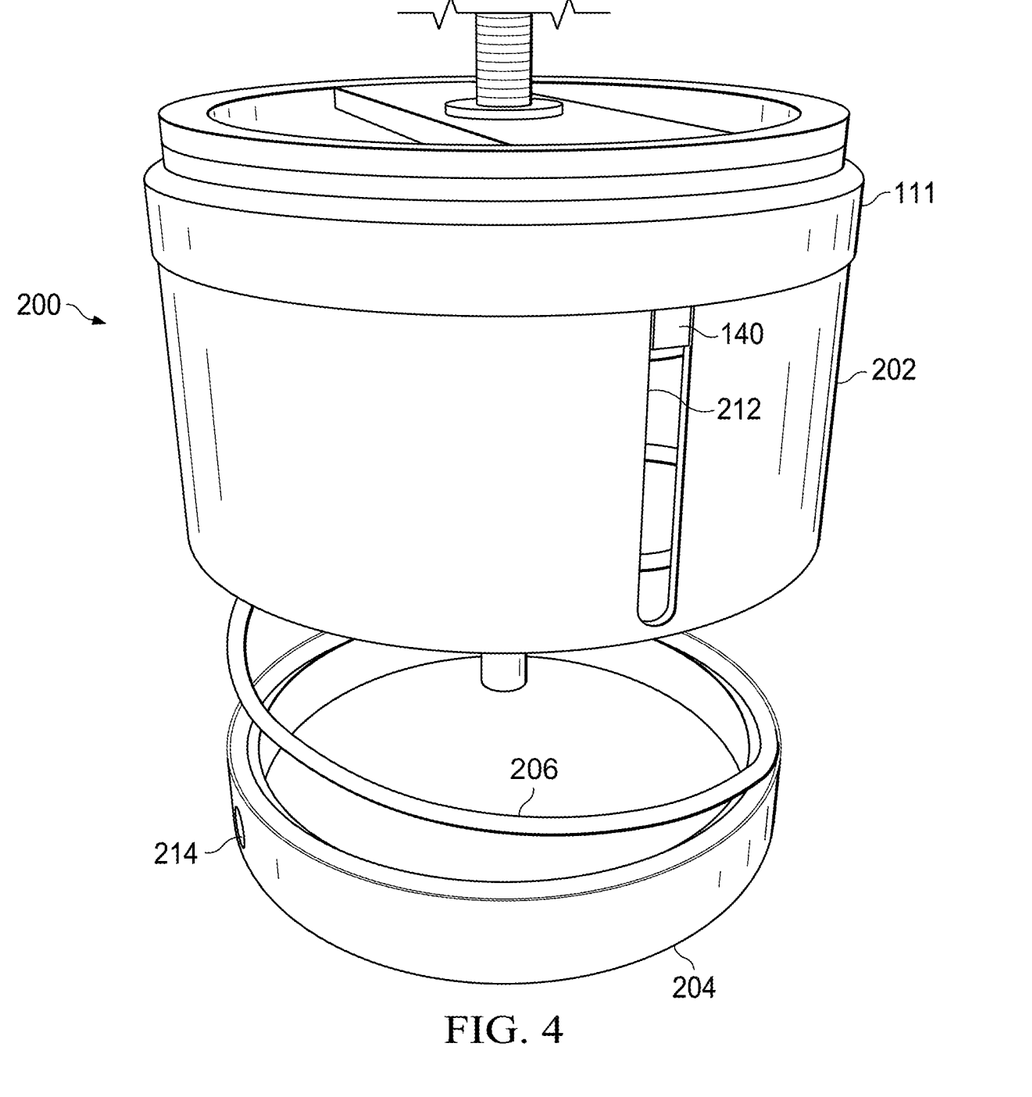
FIG. 4 is a side perspective view of the mechanical seal of FIG. 3, disassembled.

The clamping shoe 110 can include a cap 111 that engages a top surface of the mechanical seal (see FIG. 4). The clamping shoe 110 also includes a rod 126 attached to the cap 111 and a linking arm 127 pivotally attached to the lever 106 at a second pivot 128. The rod 126 can be rotationally coupled to the linking arm 127 to allow rotation of the cap 111 with respect to the lever 106. The rod 126 is constrained against pivoting about the linking arm 127 so that pivoting the linking arm 127 about the second pivot 128 pivots the cap 111 to change an angle of inclination of the cap 111 with respect to the base 102 or with respect to the lever 106.

Figure 2:
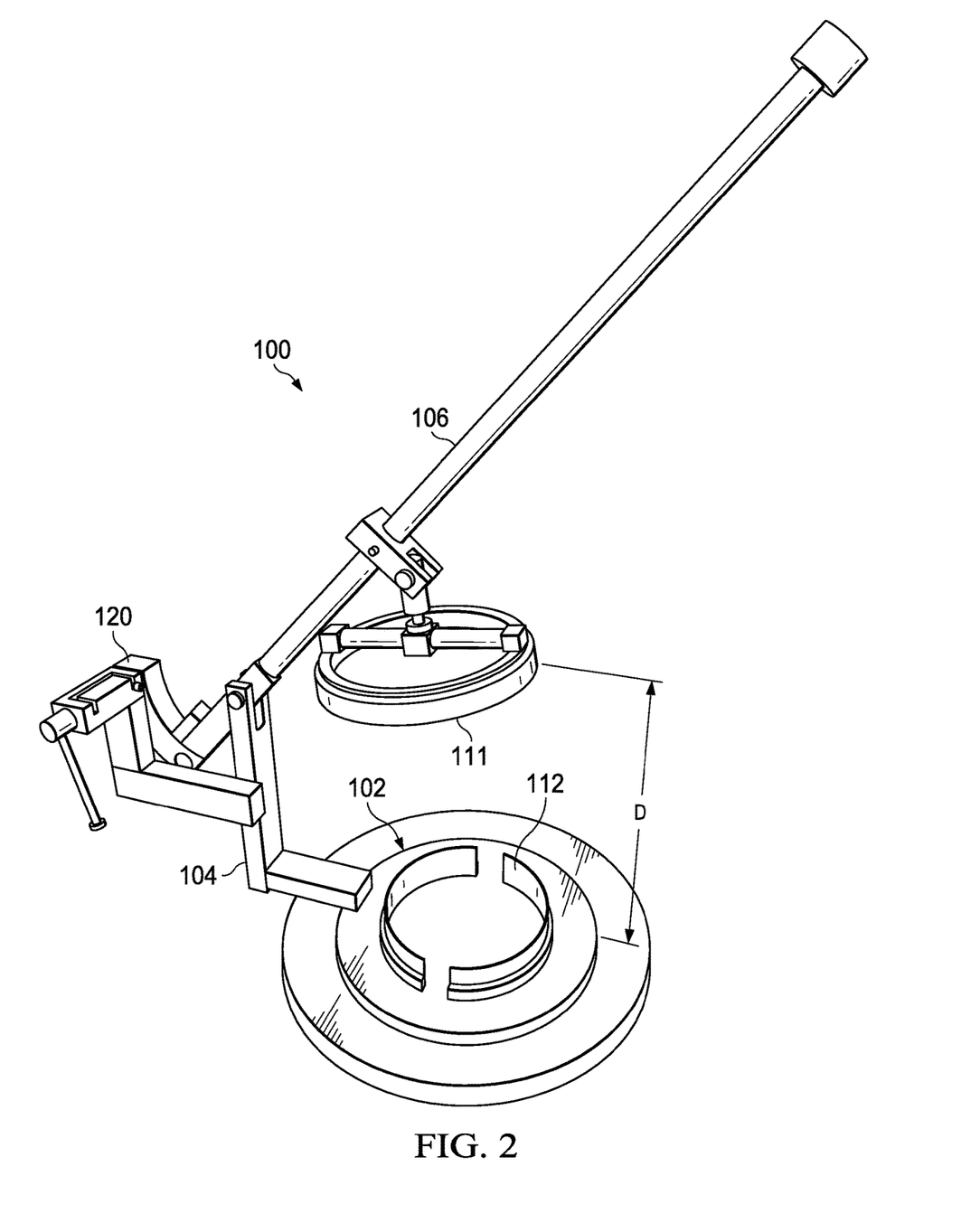
FIG. 2 is a front perspective view of the clamping assembly of FIG. 1, with the cap in a second position.

Referring also to FIG. 2, the cap 111 is movable from a first position with the lever 106 lowered and with the cap 111 disposed at a first distance 'd' away from the base 102 (see FIG. 1), to a second position. In the second position, the lever 106 is lifted and the cap 111 disposed at a second distance 'D' away from the base 102 larger than the first distance 'd'. First distance 'd' can be, for example, between 2 and 5 inches (e.g., 3.5 inches), depending on the size of the mechanical seal. Second distance 'D' can be, for example, between 8 and 12 inches (e.g., 10.75 inches). In other words, as further described in detail below with respect to FIGS. 5 and 6, the lever 106 is adapted to move the cap 111 from the second position toward the first position to engage the top surface of the mechanical seal supported on the base 102 to clamp, between the cap 111 and the base 102, the mechanical seal to maintain a spring of the mechanical seal compressed during assembly or disassembly of the mechanical seal.

As shown in FIG. 1, the fulcrum 104 includes a post 136 attached (e.g., through a link) to the top surface 121 of the base 102. The post 136 extends in a direction perpendicular with respect to the top surface 121 of the base 102. In some implementations, the base 102 can be larger such that the post 136 is fixed directly to the base 102.

The locking assembly 108 includes an arm 116 (e.g., an L-shaped arm) attached to the post 136. The locking assembly 108 also includes pin 114 coupled to and movable or slidable along the arm 116. The pin 114 defines a longitudinal central axis 'A' extending perpendicular with respect to the length 'l' of the lever 106. The pin 114 is movable along the longitudinal axis 'A'. The lever 106 has an angle rotation arm 120 attached to a second end of the lever 106 opposite the handle 117. The angle rotation arm 120 has a first hole 122 that receives the pin 114 to lock the lever 106 with the cap 111 at the first position, and a second hole 123 that receives the pin 114 to lock the lever 106 with the cap 111 at the second position, as shown in FIG. 2. Thus, the pin 114 moves along the longitudinal axis 'A' to lock the lever 106 to prevent the lever from moving and unlock the lever 102 to allow the lever to move with respect to the base 102.

The cap 111 is disposed between the first pivot 134 and the handle 117 of the lever 106 so that a force moving the lever 106 from the second position to the first position is in a direction opposite to a direction of a force applied on the cap 111 by the object (e.g., a mechanical seal) being clamped by the cap 111.

Figure 3:
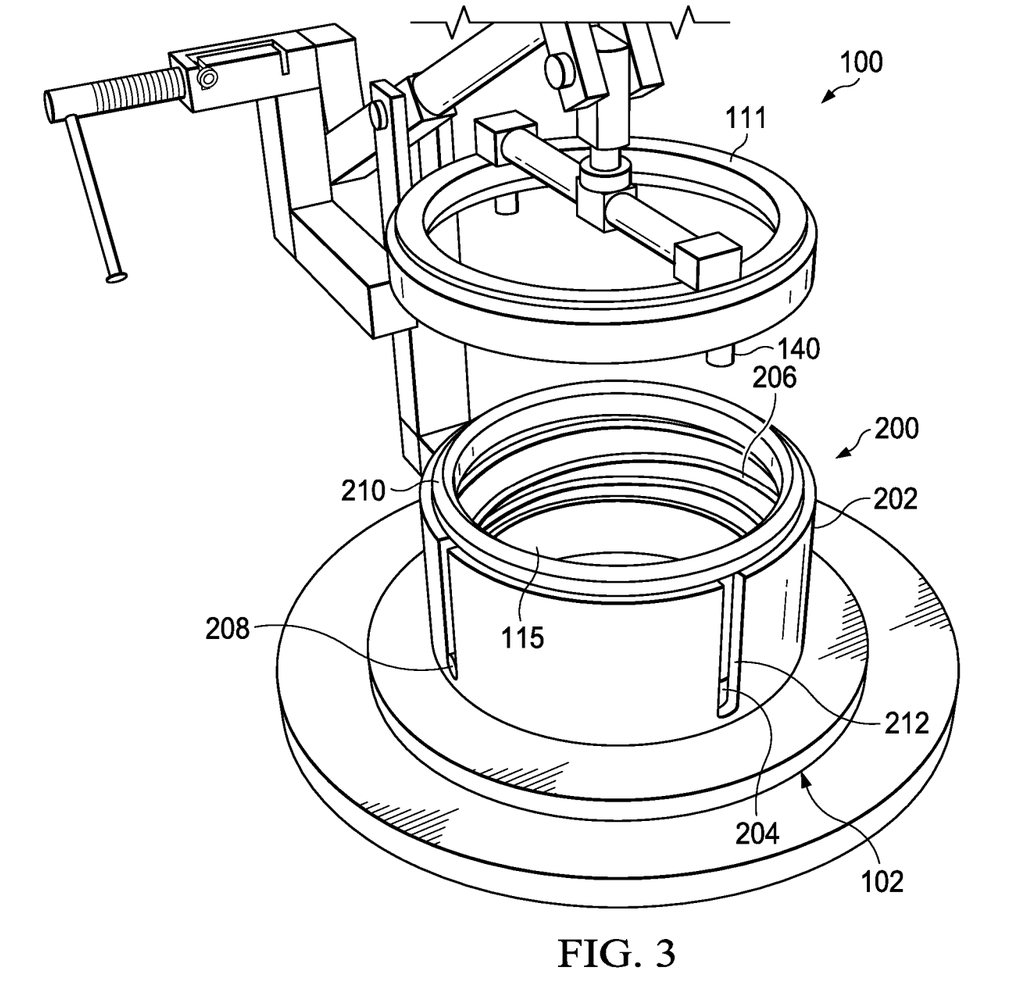
FIG. 3 is a perspective view of a portion of the clamping assembly of FIG. 1, with an assembled mechanical seal on a base of the clamping assembly.

Referring now to FIGS. 3 and 4, a mechanical seal 200 (e.g., a shaft seal of a seawater injection pump) is stood upright on the base 102 of the clamping assembly 100, with a top surface 210 of the mechanical seal 200 exposed. As shown in FIG. 4, the mechanical seal 200 includes a first sleeve 202 or housing, a second sleeve 204 or seal cap, and a spring disposed between the first sleeve 202 and the second sleeve 204. When the mechanical seal 200 is open or disassembled, the first sleeve 202 is spaced from the second sleeve 204 by the spring 206. A technician can take apart all the pieces for maintenance or replacement purposes.

As shown in FIG. 3, when the mechanical seal 200 is assembled, the second sleeve 204 is disposed at least partially inside the first sleeve 202, with the spring 206 disposed inside and compressed between the first sleeve 202 and the second sleeve 204. The spring 206 urges the second sleeve 204 away from the first sleeve 202. To maintain the spring 206 compressed, the mechanical seal 200 has one or more pins 208 that extend through the first sleeve 202 and the second sleeve 204 to maintain the spring 206 under a preload with the pin 208 under shear force applied by a force of the first sleeve 202 and an opposite force of the second sleeve 204.

As shown in FIG. 4, the first sleeve 202 has one or more slots 212 (or grooves, or other types of apertures) that receive a tooth 140 of the cap 111. The cap 111 can have one or more teeth 140 that each engage a respective slot 212 of the first sleeve 202 to prevent the first sleeve 202 from turning or twisting when clamping the disassembled mechanical seal 200. Additionally, the tooth 140 can engage the slot 212 to align one or more slots 212 of the first sleeve 202 with respective holes 214 or apertures of the second sleeve 204 to allow a technician to insert the pin 208 during assembly of the mechanical seal 200.

Figure 5:
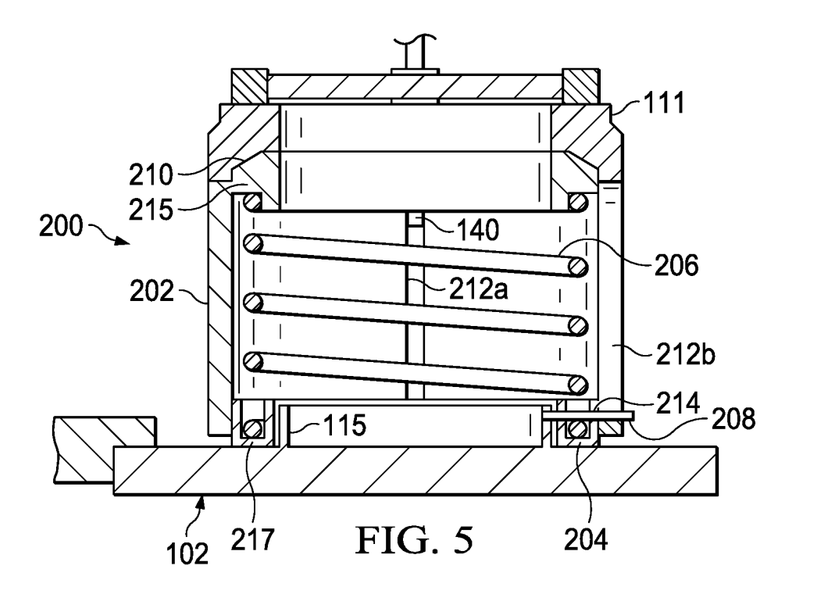
FIG. 5 is a side cross sectional view of the mechanical seal of FIG. 3, with a pin inserted.
Figure 6:
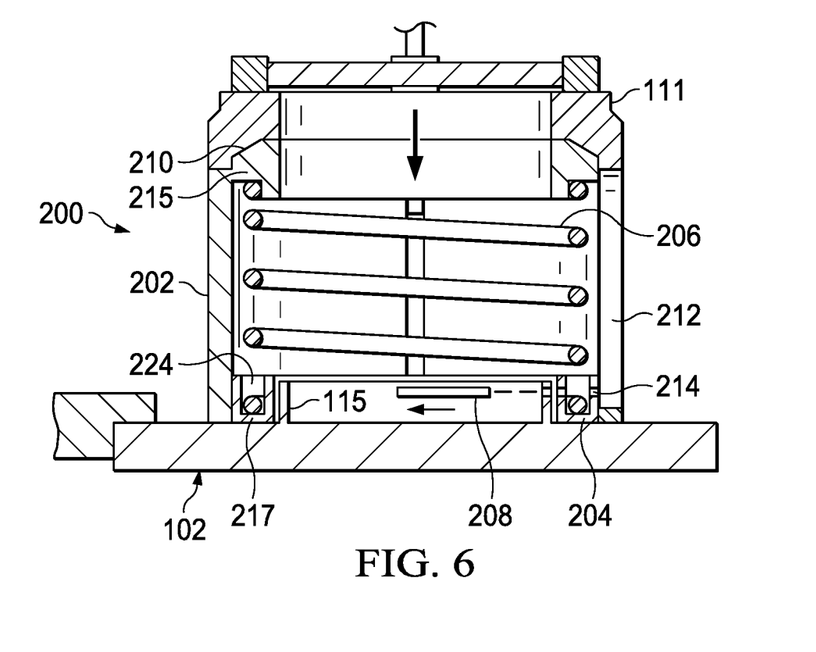
FIG. 6 is a side cross sectional view of the mechanical seal of FIG. 3, with the pin removed.

FIGS. 5 and 6 show a sequence of two steps to remove the pin 208 from the mechanical seal 200 to disassemble the mechanical seal 200. As shown in FIG. 5, the cap 111 engages the top surface of the first sleeve 202 as the lever 106 lowers the cap 111 to the first position. In the embodiment shown in FIG. 5, the mechanical seal 200 is not pushed or substantially pushed toward the base 102. As shown in FIG. 6, after engaging the top surface 210 of the first sleeve 202, the cap 111 pushes the first sleeve 202 toward the base 102 to slightly compress the spring 206 and relieve the pin 208 from some or all the shear force previously applied to the pin 208 to allow the pin 208 to be removed from the mechanical seal 200. In some implementations, the first sleeve 202 can be flush with the second sleeve 204 (i.e., the second sleeve 202 resting on the base 102 before being compressed) such that pushing or compressing the first sleeve 202 downward does not compress the spring 206. In such implementations, the lever 106 can be locked in the first position to prevent the spring from extending once the pin 208 is released.

As shown in FIG. 5, the first sleeve 202 has a first inwardly projecting shoulder 215 and the second sleeve 204 has a second inwardly projecting shoulder 217 facing the first inwardly projecting shoulder 215. The second sleeve 204 is at least partially disposed inside the first sleeve 202 to retain, between the first inwardly projecting shoulder 125 and the second inwardly projecting shoulder 217, the spring 206. The spring 206 bears against the first shoulder 215 at a first end of the spring 206 and bears against the second shoulder 217 at a second end of the spring 206 to urge, under a preload of the spring 206, the second sleeve 204 away from the first sleeve 202. As the cap 111 moves from the second position to the first position, the cap 111 clamps the first sleeve 202 between the cap 111 and the base 102 thereby compressing the spring 206.

To assemble the mechanical seal 200, the mechanical seal 200 is first positioned on the base 102 (as shown in FIG. 4). The cap 111 then engages the top surface 210 of the first sleeve 202 and the tooth 140 of the cap 111 is inserted in a first groove 212a of the first sleeve 202. The cap 111 then pushes the first sleeve 202 toward the second sleeve 204 to compress the spring 206 until the first sleeve 202 is at the base 102. With the first sleeve 202 touching the base 102, the pin 208 can be inserted through a second groove 212b of the first sleeve 202 and through the hole 214 of the second sleeve 204. Once the pin 208 is inserted, the cap 111 can be lifted from the mechanical seal 200 while the pin 208 prevents, under shear load of the pin 208, the second sleeve 204 from moving away from the first sleeve 202 past the second groove 212b. In some cases, the first groove 212a and the second groove 212b can be the same groove.

The tooth 120 of the cap 111 prevents, when inserted in the groove 212a, the first sleeve 202 from turning with respect to the base 102 during clamping of the mechanical seal 200 (e.g., as the cap 111 moves from the second position to the first position) to assemble the mechanical seal 200. Additionally, the tooth 120 together with the guide or ring 115 of the base 102 aligns the first sleeve 202 with the second sleeve 204 as the lever lowers the cap 111 from the second position to the first position to allow the pin 208 to be inserted in the mechanical seal 200. The ring 115 of the base 102 has gaps 'G' (see FIG. 1) that may receive an end of the pin 208 when the hole 214 of the second sleeve is aligned with the gap to allow the pin to extend past the second sleeve 204. The ring 115 is fixed to the base 102 and extends from the top surface of the base 102. The ring 115 defines an outer diameter less than an inner diameter of the second sleeve 204.

Figure 7:
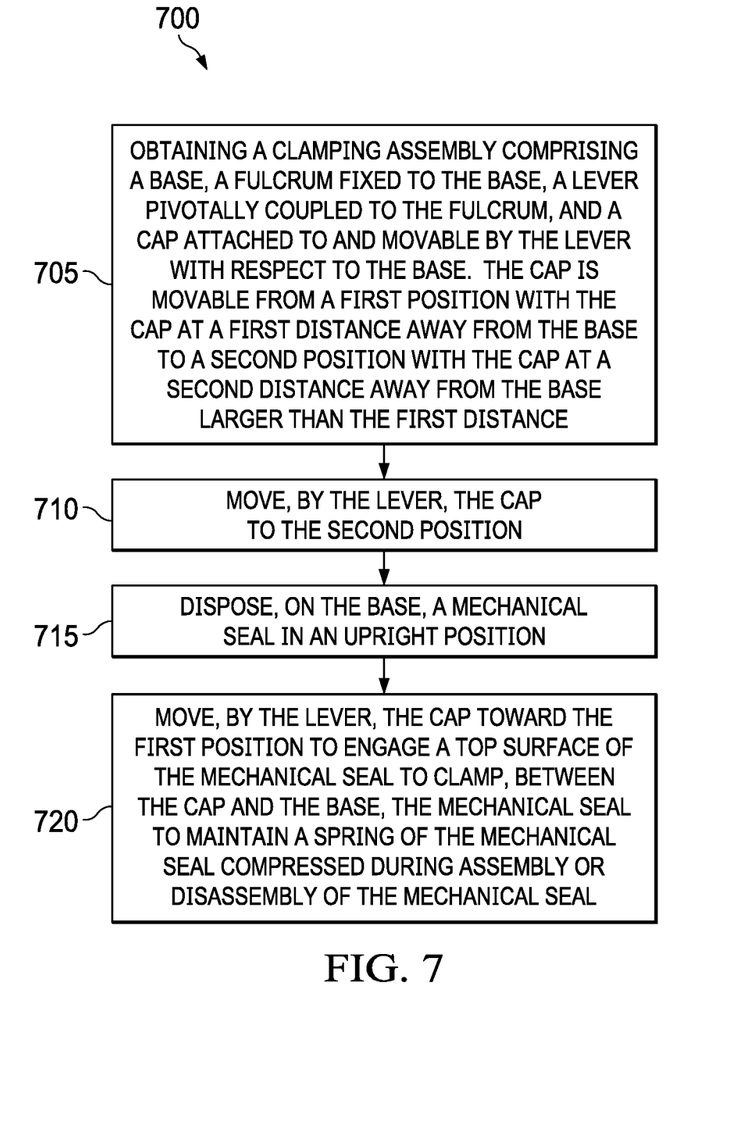
FIG. 7 is a flow chart of an example method of clamping a mechanical seal to assemble or disassemble the mechanical seal.

FIG. 7 shows a flow chart of an example method 700 of clamping a mechanical seal to assemble or disassemble the mechanical seal. The method includes obtaining a clamping assembly comprising a base, a fulcrum fixed to and extending away from the base, a lever pivotally coupled to the fulcrum at a first pivot spaced from the base, and a cap attached to and movable by the lever with respect to the base. The cap is movable from a first position with the cap at a first distance away from the base to a second position with the cap at a second distance away from the base larger than the first distance (705). The method also includes moving, by the lever, the cap to the second position (710). The method also includes disposing, on the base, a mechanical seal in an upright position (715), and moving, by the lever, the cap toward the first position to engage a top surface of the mechanical seal to clamp, between the cap and the base, the mechanical seal to maintain a spring of the mechanical seal compressed during assembly or disassembly of the mechanical seal (720).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:
1. A mechanical seal clamping assembly comprising:
a base configured to support a mechanical seal in an upright position, the base comprising a guide;
a fulcrum fixed to and extending away from the base;
a lever pivotally coupled to the fulcrum at a first pivot spaced from the base; and
a cap coupled to and movable by the lever with respect to the base, the cap configured to engage a top surface of the mechanical seal, the cap movable from a first position with the cap at a first distance away from the base to a second position with the cap at a second distance away from the base larger than the first distance;
wherein the lever is adapted to move the cap from the second position toward the first position to engage the top surface of the mechanical seal supported on the base to clamp, between the cap and the base, the mechanical seal to maintain a spring of the mechanical seal compressed during assembly or disassembly of the mechanical seal;

wherein the guide is configured to receive and align the mechanical seal with respect to the cap in the first position, the guide comprising a ring fixed to and extending from a top surface of the base and defining an outer diameter less than an inner diameter of a housing of the mechanical seal, the ring generally aligned with the cap in the first position and configured to receive the mechanical seal to retain the mechanical seal in a position generally aligned with the cap in the first position.

2. The mechanical seal clamping assembly of claim 1, wherein the cap is pivotally coupled to the lever at a second pivot, the cap configured to pivot about the second pivot to change an angle of inclination of the cap with respect to the base.

3. The mechanical seal clamping assembly of claim 1, wherein the cap is disposed between the first pivot and a handle of the lever such that a force moving the lever from the second position to the first position is in a direction opposite to a direction of a force applied on the cap by the mechanical seal.

4. A mechanical seal clamping assembly, comprising:
 a base configured to support a mechanical seal in an upright position;
 a fulcrum fixed to and extending away from the base;
 a lever pivotally coupled to the fulcrum at a first pivot spaced from the base; and
 a cap coupled to and movable by the lever with respect to the base, the cap configured to engage a top surface of the mechanical seal, the cap movable from a first position with the cap at a first distance away from the base to a second position with the cap at a second distance away from the base larger than the first distance;
 a locking assembly coupled to the base, the locking assembly comprising an arm and a movable pin coupled to the arm, the pin defining a longitudinal axis perpendicular with respect to a length of the lever, the lever comprising a handle at a first end of the lever and an angle rotation arm attached to a second end of the lever opposite the first end, the angle rotation arm comprising a first hole configured to receive the pin to lock the lever with the cap at the first position, and a second hole configured to receive the pin to lock the lever with the cap at the second position;
 wherein the lever is adapted to move the cap from the second position toward the first position to engage the top surface of the mechanical seal supported on the base to clamp, between the cap and the base, the mechanical seal to maintain a spring of the mechanical seal compressed during assembly or disassembly of the mechanical seal.

5. The mechanical seal clamping assembly of claim 4, wherein the fulcrum comprises a post attached to and extending in a direction perpendicular with respect to a top surface of the base, the locking assembly attached to the post, and the pin movable along the longitudinal axis of the pin to lock the lever to prevent the lever from moving and unlock the lever to allow the lever to move.

6. A mechanical seal clamping assembly comprising:
 a base configured to support a mechanical seal in an upright position;
 a fulcrum fixed to and extending away from the base;
 a lever pivotally coupled to the fulcrum at a first pivot spaced from the base; and
 a cap coupled to and movable by the lever with respect to the base, the cap configured to engage a top surface of the mechanical seal, the cap movable from a first position with the cap at a first distance away from the base to a second position with the cap at a second distance away from the base larger than the first distance;
 wherein the lever is adapted to move the cap from the second position toward the first position to engage the top surface of the mechanical seal supported on the base to clamp, between the cap and the base, the mechanical seal to maintain a spring of the mechanical seal compressed during assembly or disassembly of the mechanical seal; and
 wherein the mechanical seal comprises a first sleeve defining a first inwardly projecting shoulder and a second sleeve configured to be at least partially disposed inside the first sleeve and defining a second inwardly projecting shoulder, the mechanical seal comprising a spring configured to bearing against the first shoulder at a first end of the spring and bear against the second shoulder at a second end of the spring to urge, under a preload of the spring, the second sleeve away from the first sleeve, and the cap is configured to engage and move, with the cap moving from the second position to the first position, the first sleeve toward the base thereby compressing the spring.

7. The mechanical seal clamping assembly of claim 6, wherein with the mechanical seal assembled, the mechanical seal comprises a pin extending through a slot of the first sleeve and an aperture of the second sleeve to prevent, under shear load, the second sleeve from moving away from the first sleeve past the slot, and the cap is configured to urge, during disassembly of the mechanical seal, the first sleeve toward the base to allow the pin to be removed from the mechanical seal with the spring compressed.

8. The mechanical seal clamping assembly of claim 7, wherein with the mechanical seal disassembled, the cap comprises a tooth and the first sleeve comprises a slot adapted to receive the tooth to prevent the mechanical seal from turning with respect to the base during clamping of the mechanical seal as the cap moves from the second position to the first position.

9. The mechanical seal clamping assembly of claim 8, wherein the base comprises a ring comprising an open slot, the ring configured to receive the second sleeve with the open slot aligned with an aperture of the second sleeve to allow the pin to extend past the second inwardly projecting shoulder and align the second sleeve with the slot of the first sleeve during assembly of the mechanical seal.

10. A clamping assembly comprising:
 a base configured to rest on a horizontal surface and configured to support a mechanical component, the base comprising a guide;
 a fulcrum fixed to and extending away from the base;
 a lever pivotally coupled to the fulcrum at a first pivot spaced from the base;
 a locking assembly coupled to the base and configured to engage the lever to lock the lever from movement with respect to the base; and
 a clamping shoe attached to and movable by the lever with respect to the base, the clamping shoe movable from a first position with the clamping shoe at a first distance away from the base to a second position with the clamping shoe at a second distance away from the base larger than the first distance;
 wherein the lever is adapted to move the clamping shoe from the second position toward the first position to engage the mechanical component supported on the base to clamp, between the clamping shoe and the base, the mechanical component, and the locking assembly is configured to lock the lever with the clamping shoe in the first position; and wherein the guide is configured to receive and align the mechanical component with respect to the clamping shoe in the first position, the guide comprising a ring fixed to and extending from a top surface of the base and defining an outer diameter less than an inner diameter of a housing of the mechanical component, the ring generally aligned with the clamping shoe in the first position and configured to receive the mechanical component to retain the mechanical component in a position generally aligned with the clamping shoe in the first position.

11. The clamping assembly of claim 10, wherein the mechanical component comprises a shaft seal of a seawater injection pump, the shaft seal comprising the housing and a seal cap disposed, with the shaft seal assembled, at least partially inside the housing, the shaft seal comprising a spring disposed inside the housing and configured to urge the seal cap away from the housing, the shaft seal comprising a pin extending through the housing and the seal cap to maintain the spring under a preload with the pin under shear force, the clamping shoe configured to urge the housing toward the base to allow the pin to be removed to disassemble the shaft seal, with the spring compressed.

12. The clamping assembly of claim 10, wherein the mechanical component comprises a shaft seal of a seawater injection pump, the shaft seal comprising the housing, a seal cap, and a spring disposed between the housing and the seal cap, the guide configured to receive and align, during assembly of the shaft seal, the seal cap with the housing and the clamping shoe comprising a tooth configured to engage an aperture of the housing to align the aperture of the housing with an aperture of the seal cap such that, with the clamping shoe in the first position, the aperture of the housing is aligned with the aperture of the seal cap to insert a pin through the apertures of the housing and the seal cap during assembly of the shaft seal.

13. The clamping assembly of claim 10, wherein the clamping shoe is disposed between the first pivot and a handle of the lever such that a force lowering the lever from the second position to the first position is in a direction opposite to a direction of a force applied on the clamping shoe by the mechanical component.

14. The clamping assembly of claim 10, wherein the locking assembly comprises an arm attached to and extending from the fulcrum, the locking assembly comprising a movable pin coupled to the arm and defining a longitudinal axis perpendicular with respect to a length of the lever, the lever comprising a handle at a first end of the lever and an angle rotation arm attached to a second end of the lever opposite the first end, the angle rotation arm comprising a first hole configured to receive the pin to lock the lever with the clamping shoe at the first position, and a second hole configured to receive the pin to lock the lever with the clamping shoe at the second position.

15. A method comprising:
obtaining the mechanical seal clamping assembly of claim 1,
moving, by the lever, the cap to the second position;
disposing, on the base, a mechanical seal in an upright position; and
moving, by the lever, the cap toward the first position to engage a top surface of the mechanical seal to clamp, between the cap and the base, the mechanical seal to maintain a spring of the mechanical seal compressed during assembly or disassembly of the mechanical seal.

16. The method of claim 15, wherein the mechanical seal comprises a housing and a seal cap disposed, with the mechanical seal assembled, at least partially inside the housing, the mechanical seal comprising a spring disposed inside the housing and configured to urge the seal cap away from the housing, the mechanical seal comprising a pin extending through the housing and the seal cap to maintain the spring under a preload with the pin under shear force, further comprising moving, by the lever, the cap to urge the housing toward the base to allow the pin to be removed with the spring compressed.

17. The method of claim 15, wherein the mechanical seal is configured to receive and align, during assembly of the mechanical seal, the seal cap with the housing and the cap comprising a tooth configured to engage an aperture of the housing to align the aperture of the housing with an aperture of the seal cap such that, with the cap in the first position, the aperture of the housing is aligned with the aperture of the seal cap, further comprising:
moving, by the lever, the cap toward the first position with the tooth inserted in the aperture of the housing to align the aperture of the housing with the aperture of the seal cap; and
inserting a pin through the aperture of the housing and through the aperture of the seal cap to assemble the mechanical seal.

18. The method of claim 13, wherein disposing the mechanical seal on the base comprises inserting the guide of the base on the mechanical seal to align the mechanical seal with the cap in the first position.

* * * * *

UNITED STATES PATENT AND TRADEMARK OFFICE
CERTIFICATE OF CORRECTION

| | |
|---|---|
| PATENT NO. | : 11,389,913 B2 |
| APPLICATION NO. | : 17/020150 |
| DATED | : July 19, 2022 |
| INVENTOR(S) | : Darwin G. Gozun and Raed Al-Hadlaq |

It is certified that error appears in the above-identified patent and that said Letters Patent is hereby corrected as shown below:

In the Claims

In Column 12, Line 46, Claim 18, please replace "claim 13," with -- claim 15, --.

Signed and Sealed this
Sixth Day of September, 2022

Katherine Kelly Vidal
*Director of the United States Patent and Trademark Office*